United States Patent [19]

Jensen et al.

[11] Patent Number: 5,560,454
[45] Date of Patent: Oct. 1, 1996

[54] PISTON WITH BI DIRECTIONAL PASSIVE DISK VALVE AND EXTENSION-OPENABLE REGULATING VALVE

[75] Inventors: Eric L. Jensen, Dayton; Michael L. Oliver, Xenia, both of Ohio

[73] Assignee: General Motors Corporation, Detroit, Mich.

[21] Appl. No.: 488,714

[22] Filed: Jun. 8, 1995

[51] Int. Cl.⁶ .................................................. F16F 9/34
[52] U.S. Cl. ........................................ 188/299; 188/322.15
[58] Field of Search ................................. 188/281, 282, 188/299, 322.15

[56] References Cited

U.S. PATENT DOCUMENTS

| | | | |
|---|---|---|---|
| 4,972,929 | 11/1990 | Ivers et al. | 188/282 X |
| 5,139,119 | 8/1992 | Karnopp | 188/299 |
| 5,282,645 | 2/1994 | Spakowski et al. | 280/707 |
| 5,409,088 | 4/1995 | Sönsteröd | 188/299 |

*Primary Examiner*—Josie Ballato
*Attorney, Agent, or Firm*—Jeffrey A. Sedlar

[57] ABSTRACT

The incorporation of a unidirectional flow regulation valve into the piston of a damper provides continuously variable real time damping with passive compression damping. The valve is housed within the piston thus incorporating into a single component the flow passages for both the variable and passive valving. An electrical circuit is provided through componentry of the damper and regulation valve.

7 Claims, 2 Drawing Sheets

PISTON WITH BI DIRECTIONAL PASSIVE DISK VALVE AND EXTENSION-OPENABLE REGULATING VALVE

BACKGROUND OF THE INVENTION

The present invention relates to real time damping (RTD) and more particularly, to a damper with a piston assembly providing extension controlled RTD for a vehicle suspension.

Conventional vehicle suspension dampers typically consist of direct double-acting telescopic hydraulic passive dampers. They are generally described as either shock absorbers or struts. A primary purpose of shock absorbers is to dampen oscillations of the vehicle suspension springs. This is accomplished by converting kinetic energy in the form of motion between the sprung and unsprung masses of a vehicle into heat and then dissipating the heat. Struts also serve this capacity and in addition, support reaction and side load forces on the suspension.

Typical dampers are hydraulic devices using oil as the medium for converting motion into heat. As the damper is cycled a piston is forced to move in extension and compression directions through oil contained within a cylinder tube creating pressure within a portion of the cylinder tube and a consequent pressure drop across the piston. During an extension stroke high pressure is created in the extension chamber of the cylinder tube above the piston forcing oil to flow through valving in the piston. During a compression stroke high pressure is created in the compression chamber of the cylinder tube below the piston forcing oil to flow back through the piston's valving. As the piston moves an amount of oil substantially equal to the volume of the piston rod entering or exiting the cylinder tube is forced through the piston valving or through a compression valve in the base of the cylinder tube in combination with the piston valving.

As oil is forced to flow through orifices in the piston valve and/or the compression valve it is heated. This is the mechanism which allows dampers to dissipate energy stored by the suspension spring. The extent to which the oil is heated and consequently the amount of energy dissipated is controlled by the size of the orifices in the valving and the amount of flow forced through the valving.

Damping force is a common measurement of the performance of a damper. It is used to quantify the amount of spring control provided by a damper. Passive dampers are tuned to provide preselected vehicle performance characteristics.

Because passive dampers provide a set damping force they generally present somewhat of a compromise in providing optimum damping performance over a wide range of real world conditions. In response, the concept of RTD has been developed in the art wherein an algorithm is used to provide a control mechanism as a means of varying the damping force provided by a damper. This is typically achieved by varying the valving orifice sizes in rapid response to various sensors which are used to detect current real world operating conditions. RTD dampers adjust the damping force in response to the control mechanism so that various performance characteristics can be provided by an individual damper.

Such electrically controlled hydraulic dampers for vehicle suspensions have, in principle, been known in the art for some time. Their actual application in the marketplace has been somewhat of a recent phenomenon however. Accordingly, new methods of providing RTD for vehicle suspension systems are currently being sought.

SUMMARY OF THE INVENTION

According to an aspect of the present invention a damper with continuously variable extension damping fluid flow control is provided. A damper in accordance with this aspect includes a tube slidably carrying a piston which separates the tube into extension and compression chambers. The piston has an internal cavity which carries a regulating valve further separating a sub-cavity from the internal cavity within the piston. The piston includes a first opening between the internal cavity and the extension chamber, a second opening between the internal cavity and the compression chamber and a third opening between the sub-cavity and the extension chamber.

The regulating valve provides a continuously variable amount of damping by regulating extension damper fluid flow between the extension chamber and compression chamber during damper extension. Additionally, a hi-directional passive damping valve mechanism is operatively positioned on the piston between the extension and compression chambers providing damping during both extension and compression of the damper. Optionally, the two way passive damping valve is replaced by two one way passive damping valves.

According to another aspect of the present invention a unique electric circuit is provided for controlling the amount of damping provided when splitting flow between the regulating valve and the passive damping valve. Control of electric current to a solenoid assembly controls fluid flow through the regulating valve.

With a relative low amount of electrical current provided to the coil, the regulating valve permits a relatively high flow amount at low pressure drop so that a relatively low flow amount passes through the passive valving. Increasing the amount of electrical current provided to the coil, increases the pressure drop through the regulating valve thus proportionally reducing the amount of flow therethrough thus increasing the amount of flow through the passive valve. Continuously variable damping in real time is provided by varying the proportion of damping fluid flow through the regulating valve and passive valve in response to a control mechanism which monitors various vehicle conditions. The amount of compression damping provided is preselected according to the application and is defined by the passive valving.

The electrical circuit to the coil includes the regulating valve body, the piston and the piston rod. Through the use of insulators and contacts variable control current to the coil is provided while minimizing the use of conventional wire type conductors.

Advantages of the present invention include internal packaging of the regulating valve which is less space restrictive than externally packaged designs that carry the regulating valve outside the cylinder tube. Also advantageous is the use of damper and valve components to conduct current. Additionally, the invention is readily applicable to monotube or twin-tube damper designs.

DETAILED DESCRIPTION OF THE PRESENTLY PREFERRED EMBODIMENTS

Figure 1:
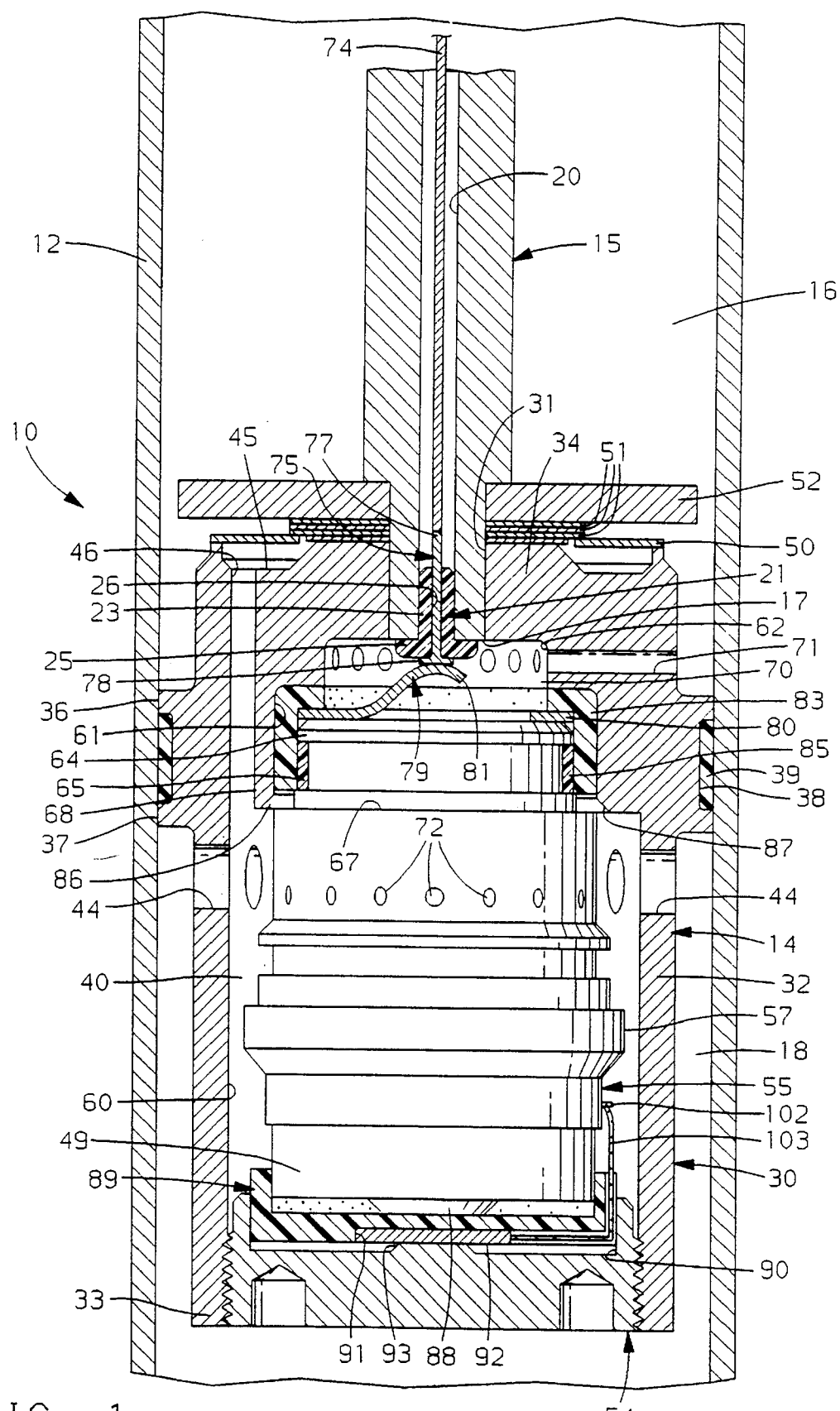
FIG. 1 is a fragmentary cross-sectional view of the piston area of a monotube damper.

Referring to the drawings, illustrated in FIG. 1 is the part of a monotube damper 10 which is most pertinent to the present invention. Damper 10 includes cylinder tube 12 which generally carries a supply of fluid (not illustrated) serving as a damping medium providing damping control between sprung and unsprung masses (not illustrated). Slidably carried within cylinder tube 12 is piston assembly 14 which separates the cylinder tube into extension chamber 16 and compression chamber 18.

Securely connected to piston assembly 14 by a conventional means is piston rod 15 which extends through extension chamber 16 of cylinder tube 12. Piston rod 15 includes axial opening 20 which extends along the length of piston rod 15. Piston rod 15 extends into opening 31 of piston body 30 and is securely connected therewith.

The piston body 30 generally comprises a cylindrical wall 32 which is substantially open at end 33 and is substantially closed at end 34. Integrally formed with cylindrical wall 32 are a pair of annular ribs 36 and 37 which extend radially outward from the cylindrical wall 32 and form a cylindrical groove 38. Cylindrical groove 38 carries a TEFLON band 39 which serves as a seal and a bearing between the piston assembly 14 and the cylinder tube 12.

A cavity 40 is formed within the piston body 30 by cylindrical wall 32. A series of radially directed openings, representative of which is opening 44, extend through cylindrical wall 32 in a band around piston body 30 providing a means of fluid communication between the internal cavity 40 and compression chamber 18. The opening 44 is freely open and provides a generally unrestricted means of fluid flow.

An annular groove 45 is formed in end 34 of piston body 30 near the cylindrical wall 32. A series of bores, representative of which is bore 46, extend axially through the piston body 30 from internal cavity 40 to annular groove 45. The annular groove 45 and bore 46 provide a fluid flow path between internal cavity 40 and extension chamber 16. This flow path, to the extension chamber 16, is closed by a bi-directional mono-disc style disc valve 50 which permits dampened flow in either direction when subjected to fluid force.

The disc valve 50 is retained at the end 34 of piston body 30 and around the piston rod 15 by a series of washers 51 and disc stop 52. The disc valve 50 provides a means of dampened fluid flow between extension chamber 16 and compression chamber 18 during both extension and compression movement of piston assembly 14. The amount of damping provided is specifically selected for each application according to selected performance criteria.

The generally open end 33 of piston body 30 is securely closed by retainer 54. Retainer 54 also secures regulating valve 55 within internal cavity 40.

Piston body 30 is configured in such a manner that a receptacle, accessible from end 33 is presented with a series of successively smaller stepped cylindrical openings for receiving regulating valve 55. These include cylindrical openings 60, 61 and 62 which are coaxial with the opening 31 that receives piston rod 15. The valve body 57 of regulating valve 55 includes an extension 64 of a relatively reduced diameter which includes groove 65 and is inserted into cylindrical opening 61. The shoulder 67 formed by the larger diameter of valve body 57 is spaced away from the wall 68 of piston body 30 to avoid electrical conduction therebetween.

The regulating valve 55 is positioned in internal cavity 40 such that a sub-cavity 70 is defined in the cylindrical opening 62 which is separated from the internal cavity 40 by regulating valve 55. A series of inflow openings, representative of which is opening 71, are arranged in an annular radially extending configuration through end 34 of piston body 30 between sub-cavity 70 and extension chamber 16. Similarly, a series of outflow openings, representative of which are openings 72, are arranged in an annular radially extending configuration through valve body 57 to the internal cavity 40 in the area of opening 44.

The regulating valve 55 is electrically operated and therefore, a means of supplying electric current thereto is provided. A wire conductor 74 communicates with the means of controlling the regulating valve 55 and extends through axial opening 20 of piston rod 15. The rod 15 operates as a second conductor.

An insulator seal 21 includes body 23 which is received within axial opening 20 of piston rod 15 and head 25 which abuts rod end 17. Insulator seal 21 includes axial opening 26 which extends through head 25 and body 23. The conductor 74 is electrically coupled to contact 75 which includes a rod-like body 77 which extends through axial opening 26 of insulator seal 21 and a contact head 78 which is presented outside axial opening 26 on head 25.

An upper contact 79 includes a substantially annular disc 80 in electrical contact with valve body 57 and a spring arm 81 in electrical contact with contact head 78. An annular insulator 83 having an L-shaped cross section is positioned within cylindrical opening 61 and insulates upper contact 79 from piston body 30. The insulator 83 also engages a seal 85 which is carried in groove 65 of extension 64. A beveled edge 87 is provided at the outer edge of cylindrical opening 61 to insure a gap 86 is maintained between shoulder 67 and piston body 30.

At the opposite end of the valve body 57 a button 88 extends from the regulating valve 55. A lower insulator 89 is positioned in a cylindrical opening 90 of retainer 54 and secures the lower end 49 of valve body 57 in position while insulating it from piston body 30. An opening 91 is provided in lower insulator 89 which carries disc-shaped lower contact 92. The retainer 54 includes an extension 93 within its cylindrical opening 90. Insulator 89 electrically separates button 88 from lower contact 92 and valve body 57 from retainer 54. Button 88 presses against insulator 92 thereby biasing lower contact 92 against extension 93 providing electrical contact therebetween.

Figure 2:
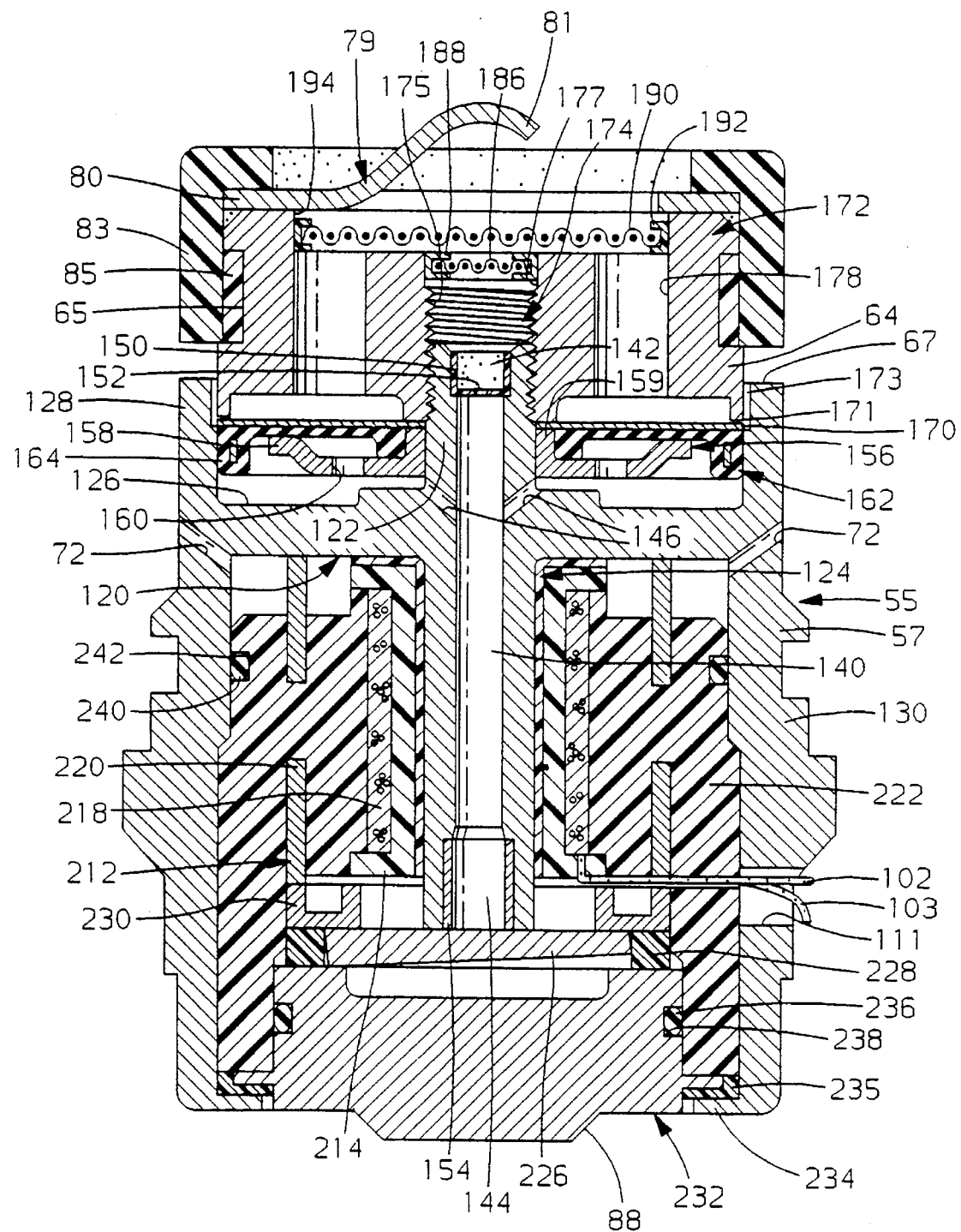
FIG. 2 is a detail cross-sectional view of the regulating valve of the damper of FIG. 1.

Referring to FIG. 2, the regulating valve 55 is illustrated in cross section detailing the internal elements. The regulating valve 55 is in general, described in U.S. Pat. No. 5,282,645 entitled "Electro-Hydraulic Pressure Regulating Valve Assembly Mounted in a Valve Boss on a Hydraulic Damper" which is commonly assigned and is specifically incorporated herein by reference. The regulating valve 55 incorporates modifications for operation in the present invention.

The valve body 57 of regulating valve 55 includes a central body portion 120 from which extension 122 and a longer extension forming pole piece 124 project in opposite directions. An annular recess 126 is formed in the central body portion 120 around the extension 122 and is bounded by a first annular wall 128. A second annular wall 130 is formed around the pole piece 124 and is spaced apart therefrom forming a frame section.

A pilot pressure chamber 140 is formed as a longitudinal channel along the axis of pole piece 124 and extension 122. An internal cavity 142 having a diameter greater than the pilot pressure chamber 140 is formed in extension 122. An internal cavity 144 having a diameter greater than the pilot pressure chamber 140 is formed in the pole piece 124. A plurality of spur channels, representative of which is spur channel 146, extend between pilot pressure chamber 140 and annular recess 126 providing fluid communication therebetween. A plurality of outflow openings, representative of which are outflow openings 72, extend through second annular wall 130.

A cup-shaped insert 150 is fitted into the cavity 142 in extension 122. The insert 150 includes a small diameter opening or pilot orifice 152 to permit fluid to pass into the pilot pressure chamber 140. A tubular hardened insert 154 is fitted into the cavity 144 which is formed in pole piece 124.

A spacer 156 is positioned about extension 122 and includes an annular flange 158 with a plurality of ports therethrough, representative of which is port 160.

Seal 162 generally comprises a C-shaped cross section and is annular in configuration. The seal 162 is positioned about an inner flange 159 of spacer 156. The seal 162 is positioned between the outer flange 158 and an annular disc 170 that is also positioned about the extension 122. The seal 162 also includes an outer annular wall 164 which engages an inner surface of the first annular wall 128 providing a seal therewith. The outer annular wall 164 remains in contact with the first annular wall 128 during all operable positions of the disc 170 and seal 162.

The disc 170 is a flexible valve member which, in combination with the outer portion of seal 162, deflects in response to fluid pressure to permit flow past seat 171 and through passage 173 out of regulating valve 55. The outer flange 158 of the spacer 156 acts as a disc stop and limits the range of deflection.

A valve nut 172 retains the disc 170, the seal 162 and the spacer 156 on extension 122. The valve nut 172 includes a central opening 174 with a threaded portion 175 for engaging the extension 122 and a cylindrical portion 177. The valve nut 172 includes a plurality of longitudinal fluid ports surrounding the central opening 174 representative of which is fluid port 178.

A low flow filter 186 is contained in a retainer 188 and is fitted into the cylindrical portion 177 of central opening 174. A high flow filter 190 is contained in a retainer 192 and is fitted into a recess 194 which is formed in the valve nut 172 coaxially with the central opening 174. The high flow filter 190 filters fluid before entering ports 178 and the central opening 174 while the low flow filter 186 filters only that fluid which enters central opening 174 and which must pass through the orifice 152.

Upper contact 79 is positioned adjacent the valve nut 172 and insulator 83 is positioned over the upper contact 79 and the outer circumference of the valve nut 172. The seal 85 is positioned in cylindrical groove 65 of valve nut 172 and provides a fluid seal between the insulator 83 and the valve nut 172.

An electric solenoid assembly 212 is mounted on the pole piece 124 and is received within the second annular wall 130. The solenoid assembly 212 includes a annular bobbin 214 having an axial opening for receiving the pole piece 124. Means are provided for communication of current from the valve body 57 to the coil 218 through lead 102 and from coil 218 to the lower contact 92 (illustrated in FIG. 1) through lead 103. Lead 102 is directly connected to the valve body 57 outside opening 111 and lead 103 is directly connected to the lower contact 92. The opening 111 is provided for the leads 102 and 103 through the valve body 57. A cylindrical ring pole 220 is positioned about the bobbin 214. A nonconductive encasement 222 is provided about the coil 218 and ring pole 220.

A hinged or tapered armature 226 is carried within a nonconductive ring spacer 228 and is positioned on a ring seat 230 so that the armature 226 rests on the outer end of hardened insert 154.

A retainer 232 is secured adjacent the ring spacer 228 by a crimped or rolled annular flange 234 of the second annular wall 130 with an insulator 235 positioned therebetween. A seal ring 236 is positioned in a groove 238 on the retainer 232 to provide a fluid seal between the retainer 232 and the encasement 222. A seal ring 240 is positioned in a groove 242 in the outer circumference of the encasement 222 to provide a fluid seal between the encasement 222 and the second annular wall 130.

In the operation of regulating valve 55 the majority of entering fluid passes through the ports 178 of the valve nut 172 and deflects the disc 170 away from the annular seat 171. The seal 162 prevents fluid leakage around the perimeter of the deflected disc 170. Deflection of the disc 170 and seal 162 opens a flow path from the port 178 to the outflow opening 72 out of the regulating valve 55.

The solenoid assembly 212 is used to control the fluid pressure in the pilot pressure chamber 140 and therefore, the deflection of disc 170. A magnetic hydraulic force balance is formed as the armature 226 is forced away from the hardened insert 154 by fluid flow in the pilot pressure chamber 140. Energization of the coil 218 draws the armature 226 towards the insert 154 thereby increasing the pressure in the pilot pressure chamber 140 and increasing the resistance to deflection of the disc 170 by increasing fluid pressure there-behind. Fluid passing the armature 226 travels through outflow opening 72 and out of the regulation valve 55.

A controller (not illustrated) communicates with the coil 218 and provides selective energization thereof. The flow of current to the coil passes through conductor 74 to contact 75 and from the contact head 78 to spring arm 81 of upper contact 79. From upper contact 79 current passes to the valve nut 172 and therethrough to the valve body 57. From the valve body 57 current passes to the coil 218 through lead 102. From the coil 218 current passes to lower contact 92 through lead 103. From lower contact 92 current passes through retainer 54 to piston body 30 and through piston body 30 to piston rod 15 and out of a damper 10. A connector (not illustrated) is provided near the top of the piston rod for engaging controller interfacing means (not illustrated), providing communication with conductor 74 and the piston rod 15 as a conductor.

Through means of the foregoing structure, a monotube damper 10 is provided with real time proportional valving. The regulating valve 55 is unidirectional to provide continuously variable extension damping. Extension damping is also provided through the disc valve 50 which is arranged in parallel with the regulating valve 55. By varying the control current supplied to solenoid 212 the amount of extension damping fluid flow is proportioned between regulating valve 55 and the disk valve 50 which provide individual amounts of damping. Compression damping is provided solely through the disc valve 50.

What is claimed is:

1. A damper comprising:

a tube;

a piston slidably carried in the tube movable in an extension direction and in a compression direction;

a bi-directional disk valve mounted on the piston openable when the piston moves in the extension direction and when the piston moves in the compression direction; and a regulating valve carried by the piston openable only when the piston moves in the extension direction wherein the regulating valve includes a coil operating on current and wherein the amount of damping fluid flow during movement of the piston in the extension direction is proportioned between the bi-directional disk valve and the regulating valve according to the relative amount of current supplied to the coil.

2. A damper according to claim 1 wherein the coil includes a first lead and the regulating valve includes a valve body, the first lead being electrically connected to the valve body.

3. A damper according to claim 2 further comprising a piston rod connected to the piston wherein the coil includes a second lead in electrical communication with the piston rod.

4. A damper according to claim 3 further comprising a conductor extending through the piston rod, the conductor being in electrical communication with the valve body.

5. A damper with continuously variable extension damping fluid flow control comprising:

a tube;

a piston with an internal cavity slidably carried within the tube separating the tube into extension and compression chambers and having a first opening between the internal cavity and the extension chamber and a second opening between the internal cavity and the compression chamber;

a bi-directional damping valve operatively carried by the piston between the extension chamber and the compression chamber; and a regulating valve carried by the piston separating a sub-cavity from the internal cavity and controlling the extension damping fluid flow between the sub-cavity and the internal cavity with a third opening in the piston between the sub-cavity and the extension chamber.

6. A damper according to claim 5 further comprising a solenoid carried within the regulating valve wherein the extension damping fluid flow is variably proportioned between the bi-directional damping valve and the regulating valve by the solenoid.

7. A damper according to claim 6 wherein the extension damping fluid flow through the regulating valve passes from the extension chamber through the third opening of the piston into the sub-cavity, from the sub-cavity through the regulating valve into the internal cavity and from the internal cavity through the second opening of the piston to the compression chamber and wherein the extension damping fluid flow through the bi-directional damping valve passes from the extension chamber though the bi-directional damping valve and through the first opening in the piston to the internal cavity and from the internal cavity through the second opening in the piston to the compression chamber.

* * * * *